United States Patent [19]

Amelse et al.

[11] 4,385,915

[45] May 31, 1983

[54] REMOVAL OF GERMANIUM FROM THE EFFLUENT OF PROCESSES FOR THE PRODUCTION OF OPTICAL COMPONENTS

[75] Inventors: Jeffrey A. Amelse, New Providence; Michael P. Bohrer, Washington; Darwin L. Wood, New Providence, all of N.J.

[73] Assignee: Bell Telephone Laboratories, Incorporated, Murray Hill, N.J.

[21] Appl. No.: 353,582

[22] Filed: Mar. 1, 1982

[51] Int. Cl.³ .............................................. C03B 37/075
[52] U.S. Cl. ........................................ 65/3.12; 65/18.2
[58] Field of Search ................. 65/3.12, 18.2; 427/163

[56] References Cited

U.S. PATENT DOCUMENTS

| | | |
|---|---|---|
| 4,217,027 | 8/1980 | MacChesney et al. .......... 65/18.2 X |
| 4,280,829 | 7/1981 | Sheth .............................. 65/3.12 X |
| 4,302,230 | 11/1981 | MacChesney et al. ............. 65/3.12 |
| 4,304,581 | 12/1981 | Saifi ..................................... 65/3.12 |

FOREIGN PATENT DOCUMENTS 52-45347  4/1977  Japan ..................................... 65/3.12

OTHER PUBLICATIONS

Simpson et al., "High Rate MCVD", *Journal of Non-Crystalline Solids*, May–Jun. 1980, pp. 831–836.

*Primary Examiner*—Richard V. Fisher
*Attorney, Agent, or Firm*—Bruce S. Schneider

[57] ABSTRACT

Recovery of germanium from the effluent of optical fiber manufacturing processes depends on the realization that the germanium is to a substantial extent in gaseous form. Thus, to separate the germanium effectively appropriate measures are taken to separate not only particulate matter but also gaseous germanium compounds. This separation is done through among other steps an appropriate solvation and precipitation to remove the gaseous germanium material.

7 Claims, 3 Drawing Figures

REMOVAL OF GERMANIUM FROM THE EFFLUENT OF PROCESSES FOR THE PRODUCTION OF OPTICAL COMPONENTS

BACKGROUND OF THE INVENTION

1. Field of the Invention

This invention relates to the manufacture of optical communication components and, in particular, to such manufacturing processes employing a germanium compound.

2. Art Background

The use of optical fiber communication systems has increased dramatically in recent years. This increase is not only likely to continue but the rate of increase is likely to substantially accelerate. Thus, there is great promise that a substantial quantity of optical components and, in particular, optical fiber will be manufactured in the near future. It follows that a reduction in cost of such items would be quite significant.

Presently, optical components such as optical fibers are being manufactured through a sequence of manufacturing steps which include the reactions of a silicon containing gas, such as silicon tetrachloride, and reactions of a germanium containing gas, such as germanium tetrachloride, to form a glass with suitable optical properties. In such processes generally the effluent from the induced germanium and silicon reactions are vented to the atmosphere. Such effluents typically include a significant amount of particulate as well as gaseous materials. Indeed, a significant amount of particulate matter is expected since the object of the thermal reaction is to produce glassy materials and since particulate incorporation into the glass structure being manufactured is relatively inefficient. For example, generally in typical manufacturing processes $SiCl_4$ reacts with $O_2$ (as in the MCVD process described in J. B. MacChesney, "Materials and Processes for Preform Fabrication-Modified Chemical Vapor Deposition," *Proceedings of IEEE,* 68, 1181–1184 (1980)) or $O_2$ and $H_2$ (as in the soot process described in P. C. Shultz, "Fabrication of Optical Waveguides by the Outside Vapor Deposition Process," *Proceedings of IEEE,* 68, 1187–1190 (1980)) or as in the VAD process described in T. Izawa and N. Inagaki, "Materials and Processes for Fiber Preform Fabrication-Vapor Phase Axial Deposition," *Proceedings of IEEE,* 68, 1184–1187 (1980)) to produce particulate $SiO_2$ with close to 100 percent efficiency and with approximately 50 percent incorporation of these particulates into the glass body being fabricated.

The cost of optical fibers produced by manufacturing processes including particulate forming methods has decreased significantly as the volume of optical fiber use has increased. However, since the use of optical fibers is expected to substantially accelerate, further decrease in costs not associated with mere economies of scale would be desirable.

SUMMARY OF THE INVENTION

It has been found that in reaction processes which are performed in the substantial absence of hydrogen, such as the hydrogen present in water, germanium in the effluent is not primarily found in particulate material. Instead, surprisingly, the gaseous portion of the effluent contains a large portion of the discarded germanium. By removing the germanium in these gases and collecting it in a state suitable for recycling, a substantial reduction in cost involved in manufacturing optical fibers is achieved. (Germanium is by far the most expensive element used in the manufacturing process.) An effective means for removing the germanium from the gas phase and, incidently any germanium in particulate form, involves a recirculating process. In this process, the manufacturing effluent is treated with an aqueous medium to ensure dissolution of germanium containing gases such as $GeCl_4$ through the processes of absorption and hydrolysis of the absorbed gas in the medium. The aqueous medium is filtered of particulates and recycled for addition of more effluent and for refiltration. Through the use of a basic or acidic media, a substantial amount of the particulate matter is also dissolved prior to filtration. Thus, the concentration of germanium in the medium is substantially increased by the recycling process and by the dissolution of germanium containing particulates. A relatively small percentage of the recycling medium is periodically or continuously removed for precipitation of germanium. The removed portion is treated with a multivalent cation such as $Mg^{+2}$ to induce the formation of a corresponding precipitate such as $MgGeO_3$. The precipitate is then separated from the remaining liquid by conventional means.

DETAILED DESCRIPTION

Figure 1:
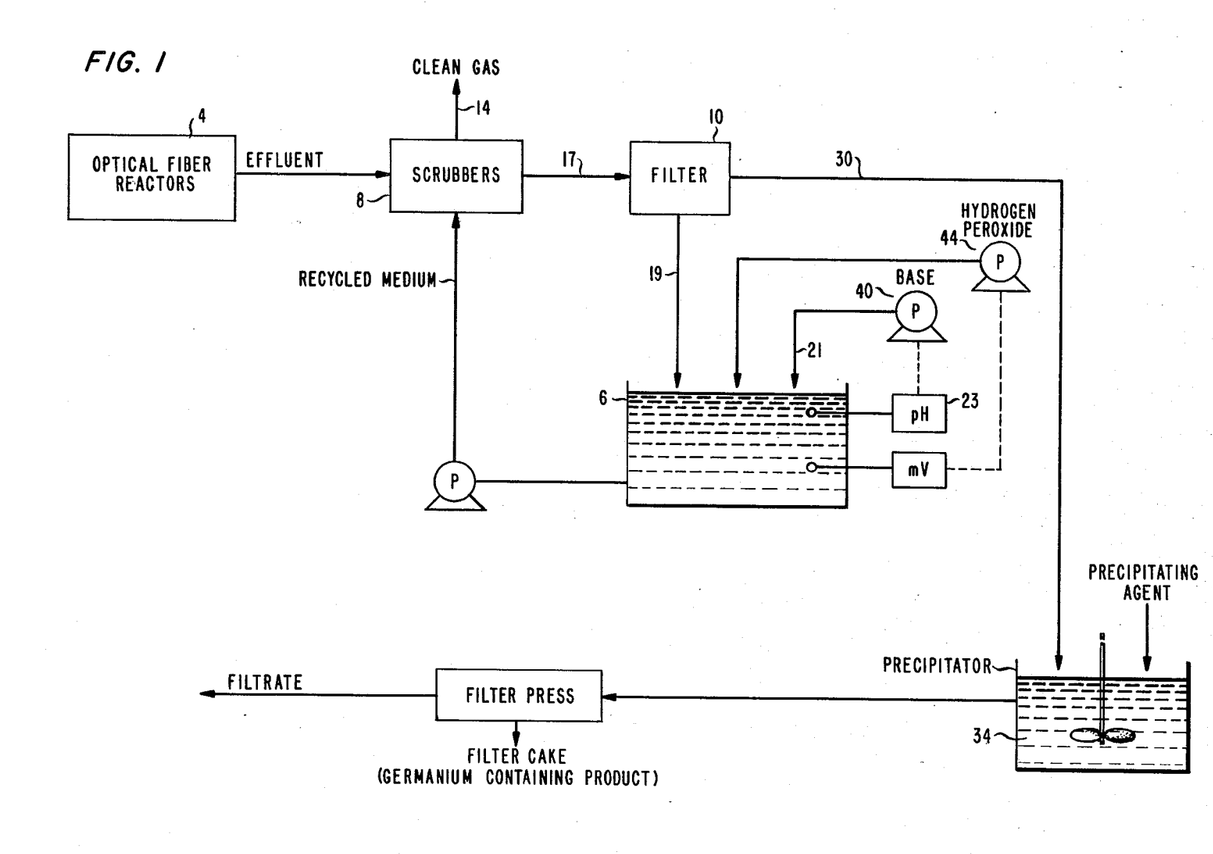
FIG. 1 is a diagram illustrating features of the inventive process.

FIG. 1 is a block diagram of a suitable technique for removing germanium from the effluent of an optical fiber manufacturing process such as MCVD that is done in the substantial absence of hydrogen such as the hydrogen in water. (The MCVD process is fully described in U.S. Pat. No. 4,217,027 issued Aug. 12, 1980 which is hereby incorporated by reference.) The effectiveness of this technique relies on the effcient removal of germanium from the effluent gases. The inventive process thus also relies on the realization that a large portion of the germanium exiting the MCVD manufacturing process is, in fact, a gaseous rather than particulate material.

In a first step, the effluent is contacted with an aqueous solution such as a basic aqueous solution primarily to trap the germanium containing gases, and also if present, to remove chlorine from the effluent. As can be seen from FIG. 1, one procedure for accomplishing this step is by passing the effluent through a scrubber, 8. In the scrubber the effluent gases are contacted with the aqueous medium by the provision of a large gas-liquid interfacial area. This interface is typically formed by spraying the medium through a nozzle onto a bed of packing or onto fixed screens. (Additionally, in the scrubber the particulates are wetted through inertial collisions with solution droplets.)

The germanium containing gases such as germanium chlorides, e.g., germanium tetrachloride that are typically present in the reaction effluent are, as previously discussed, conveniently trapped in an aqueous solution through their absorption and subsequent hydrolysis. The pH of the aqueous medium does not substantially affect the absorption and hydrolysis procedure, and thus, the trapping process for the germanium containing gases. However, if the pH is excessively low, i.e., the medium is excessively acidic, e.g., having a pH less than zero, there is the possibility of a substantial decrease in the amount of germanium containing gases that remain absorbed and hydrolyzed.

In contrast, the absorption of chlorine in the effluent is substantially affected by the pH of the aqueous medium. Chlorine is considered a pollutant and it is undesirable to vent it to the atmosphere. Thus for environmental reasons, chlorine is advantageously trapped and converted into innocuous entities. Although the trapping and conversion of chlorine is not essential for the performance of the inventive process, it is desirable. To achieve the removal of chlorine, the use of a basic aqueous medium is employed. If the chlorine is to be made innocuous for environmental reasons, the medium should be sufficiently basic that substantially all the chlorine is removed from the effluent. The amount of chlorine present in the effluent depends on the conditions used in the glass forming procedure and on the molar flow rate of chlorine containing reactants such as $SiCl_4$ and $GeCl_4$ used for glass forming. Typically for treating the effluent from one reactor operated under typical conditions, an aqueous medium with a pH in the range 11 to 13 and with a flow rate in the range from 4 to 120 l/min is employed to remove the chlorine that is present.

It is contemplated for typical processes such as MCVD involving reactive germanium and silicon compounds such as $SiCl_4$ and $GeCl_4$ that the predominant reactions between a basic aqueous medium and the effluent occurs in accordance with the following equations:

$$Cl_2(gas) + 2OH^- \rightleftharpoons ClO^- + H_2O + Cl^- \quad (1)$$

$$GeCl_4(gas) + 5OH^- \rightleftharpoons HGeO_3^- + 2H_2O + 4Cl^- \quad (2)$$

$$SiO_2(solid) + OH^- \rightleftharpoons HSiO_3^- \quad (3)$$

$$GeO_2(solid) + OH^- \rightleftharpoons HGeO_3^-. \quad (4)$$

Reactions (2) through (4) represent the formation of the monoprotonated anion of the meta acids of silicon and germanium. It is contemplated that these species are the predominant (although not necessarily the only) species present for typical basic media. (For acidic media the corresponding solvated entities are believed to be $H_2GeO_3$ and $H_2SiO_3$.) A controlled sample is employed to determine the most satisfactory pH for a given germanium gas concentration, chlorine concentration, and medium flow rate. (Germanium gas concentration significantly affects the removal of $Cl_2$ since it consumes $OH^-$ during hydrolysis according to reaction (2). Reactions (3) and (4) are relatively slow and do not substantially affect the $OH^-$ concentration in the aqueous medium during the processing period before pH adjustment and recycling.) To adequately remove chlorine, an excessively high pH, i.e., a pH higher than 13, is generally not required. Reactions (1) and (2) proceed rapidly and the quantity of $OH^-$ ions present at typical flow rates exceeds that required by the stoichiometry of reactions (1) and (2). Additionally at a pH higher than 13, excessive absorption of $CO_2$ from the atmosphere occurs. An excessively low pH, i.e., below 11, with the corresponding low medium flow rate appropriate for $Cl_2$ removal of this pH is also generally unacceptable for chlorine removal since it forces the equilibrium in equation (1) towards the left, i.e., towards the evolution of chlorine gas.

As discussed, chlorine is generally present in the effluent, and it is desirable to convert this pollutant to a less toxic form. As can be seen from equation (1) through the use of a basic medium, hypochlorite ions, are typically formed. Hypochlorite ions, however, are also generally considered a pollutant. Recycling of the basic media will not only concentrate the dissolved germanium but also the hypochlorite ion, thus, making it undesirable to discard the medium as such. It is therefore also advantageous, although not essential, to convert these ions into relatively innocuous entities before discharge. to achieve this goal it is desirable to add hydrogen peroxide ($H_2O_2$) to the aqueous medium. In a basic medium, $H_2O_2$ converts the hypochlorite present into chloride ions, oxygen, and water through the redox reaction $$H_2O_2 + ClO^- \rightleftharpoons Cl^- + O_2 + H_2O. \quad (5)$$

Addition of an appropriate amount of peroxide is easily accomplished by measuring the redox potential of the aqueous medium, e.g., by measuring the electrochemical potential between a platinum electrode and a saturated calomel electrode in the aqueous medium. The appropriate redox potential range depends on the pH of the aqueous medium. The upper and lower limits of this redox potential are linearly dependent on the pH. For example, a suitable redox potential range (with the platinum electrode being positive) for a pH 11 and a pH 13 medium is $-50$ mV to $+550$ mV and $-180$ mV to $+365$ mV, respectively. For lower, higher, or intermediate pHs the upper and lower range limits are determined by a linear extrapolation on lines connecting the upper range limits and the lower range limits, respectively, given for pH 11 and 13. If the optical fiber process does not result in the formation of chlorine, the necessity of employing $H_2O_2$ and a basic medium is obviated.

The aqueous solution which contains the effluent is preferably, although not necessarily, filtered to remove particulates before recycling the basic medium to the scrubber. The solid discharge from the filter, 10, containing the particulates is advantageously retained since some germanium remains in the particles. The filtered liquid, except for a relatively small aliquot, is recycled. An advantageous method for obtaining this aliquot is to continuously remove an amount which has a volume of 1 to 10, preferably 1 to 3 percent of the total recycled liquid medium. The removed portion is treated to precipitate the germanium. The bulk of the aqueous medium which is not removed from the cyclic process is employed for further dissolving effluent from the optical fiber manufacturing processes. Through the recycling, the concentration of the dissolved germanium in the basic solution is maintained—after a brief initial period to establish steady state—at a relatively high steady state level. (Thus, the germanium level in the removed aliquot is equal to this relatively high value.) It is desirable to maintain the percentage of the aqueous medium solution that is recycled and the flow rate of the recycled material at a level such that the material removed from this cyclic process has a concentration of germanium above 0.1 g/l. Although not precluded, lower concentrations require excessive processing time for precipitation, and for extremely low levels the precipitating agent is ineffective. It is also desirable for the recycling process to be operated on a continuous flow basis. (However, a periodic procedure involving the dissolution of the gaseous material followed by storage and concentration without recycling is not precluded.) A holding tank, 6, is advantageously employed to hold the aqueous medium prior to recycling to contact additional effluent, e.g., recycling to a scrubber. In a holding tank it is possible to easily check the pH and redox potential of the solution so that appropriate adjustments to maintain the pH and redox potential through the addition, for example, of a basic material, 40, and $H_2O_2$, 44, respectively are accomplished. (The pH is substantially lowered by the absorption of and reaction with chlorine and $GeCl_4$ and thus requires adjustment.) It is also advantageous to add sufficient water to the tank to compensate for the portion of aqueous medium removed for precipitation and the portion lost through evaporation.

The aliquot removed from the cyclic procedure is treated with a precipitating agent. The particular precipitating agent employed is not critical and is generally any multivalent cation. However, the amount of precipitating agent needed, to a large extent, depends on the particular precipitating ion employed. It has been found that the number of moles of precipitating agent required to adequately precipitate the solubilized germanium, i.e., to precipitate at least 90 percent of the germanium in solution, is typically less for $Mg^{+2}$ and $Al^{+3}$ than for other precipitating agents such as $Ca^{+2}$, $Fe^{+2}$, $Fe^{+3}$, and $Zn^{+2}$. (With $Al^{+3}$ as the precipitating agent, some possibility of redissolution of the germanium precipitate is present at high pH, e.g., above approximately 11.5 because of the amphoteric nature of $Al^{+3}$.) The addition of the precipitating agent such as $Mg^{+2}$ results in reactions such as $$Mg^{+2} + HGeO_3^- \rightleftharpoons MgGeO_3 + H^+ \qquad (6)$$

$$Mg^{+2} + HSiO_3^- \rightleftharpoons MgSiO_3 + H^+ \qquad (7)$$

$$Mg^{+2} + 2OH^- \rightleftharpoons Mg(OH)_2. \qquad (8)$$

As can be seen from equations (6) through (8), hydroxide ions compete with solubilized germanium and silicon species for the precipitating agent, e.g., $Mg^{+2}$, $Ca^{+2}$, $Fe^{+2}$, $Fe^{+3}$, $Al^{+3}$, or $Zn^{+2}$. When $Mg^{+2}$ is employed to precipitate the germanium, a mole ratio of $Mg^{+2}$ to dissolved Ge of 1 will typically precipitate more than 90 percent of the germanium without precipitation of a substantial amount of magnesium hydroxide. In contrast, when $Ca^{+2}$ is used, a mole ratio of $Ca^{+2}$ to dissolved Ge of at least 2 is typically required to precipitate more than 90 percent of the germanium. Additionally, in the latter case a substantial portion of calcium hydroxide is formed. Thus, more calcium is employed to remove the germanium from solution and more precipitate is produced. Although calcium is generally less costly than magnesium the greater quantity of the combined germanium and $Ca(OH)_2$ precipitate typically makes the use of $Ca^{+2}$ less favorable than that of $Mg^{+2}$. (Although generally less convenient, the use of precipitating agents other than $Mg^{+2}$ such as $Ca^{+2}$, $Fe^{+2}$, $Fe^{+3}$, $Al^{+3}$ and $Zn^{+2}$ is not precluded.)

It is useful to use a mole ratio of (1) $Mg^{+2}$ to (2) germanium plus silicon (equation (6) and (7)) in the range 1:1 to 1:10, preferably 1:1 to 1:3. (At ratios near 1:1 thorough mixing is required. Additionally, careful control of pH for precipitation in the range described below becomes more important.) Ratios above 1:10 are not precluded but are economically undesirable due to the excessive cost of magnesium and due to the excessive dilution of germanium in the precipitate. Ratios below 1:1 generally result in inadequate germanium precipitation.

Typically, it is desirable to perform the precipitation in a solution that has been adjusted to a pH in the range of 9.5 to 11. Lower pHs result in incomplete precipitation due to a shift of reaction (6) through (8) towards the left, while higher pHs reslt in incomplete precipitation of the germanium due to an increase in magnesium consumption through formation of the hydroxide by reaction (8). Lower and higher pHs are not precluded but require a greater amount of precipitating cation to avoid these problems. After precipitation, the filtrate containing the germanium is separated from the liquid by conventional techniques such as the use of a filter press. Thus, both the germanium initially in the gas phase and initially found as particulates are removed from the reaction effluent in a form suitable for recycling into gases such as germanium tetrachloride for production of further optical fiber.

The following examples illustrate appropriate conditions for practicing the subject invention.

EXAMPLE 1

Each of 62 glass lathes, 4, in FIG. 1 used in the production of optical fiber through a MCVD process was fitted with a scrubber, 8 (manufactured by Heat Systems-Ultrasonic, Inc., Model No. HS-7R F.O.). This scrubber utilizes a pin-jet nozzle with a free-passage orifice of 0.066 inches. The nozzle was directed towards a packing formed from plastic screens. The lathe effluent was drawn into the scrubber through an orifice which is coaxial with the nozzle by the use of a blower (nominally 85 CFM). An aqueous NaOH solution with a pH of 12 was forced through the nozzle at a flow rate of approximately 1.75 gal/min to produce a spray. In this manner, the gas contacts the aerosol spray in the air between the nozzle and the screen and also on the screen packing itself. The contacted media, which has dissolved silicon and germanium gases and suspended particles from the effluent, drains from the screens and is collected. Approximately, 1.25 gal/min of the aqueous medium was sprayed over the walls of the scrubber to remove any particulates and the spray was combined with the medium collected from the screens. The unabsorbed gases, e.g., oxygen from the effluent are exhausted through the blower at 14.

The basic aqueous medium output from each scrubber, 17, was combined and introduced into the bottom of a moving sandbed filter, 10. This filter essentially includes a moving sandbed that gravitates from the top of the filter to the bottom. The aqueous medium was introduced, under pressure, at the bottom of the filter, and under the influence of this pressure, was forced through the moving sandbed to the top of the filter. The aqueous medium, thus filtered, was removed at the top of the filter. The sand with its particulates and a portion of the aqueous medium is forced up a centrally located conduit with pressurized air. Baffles at the top of this conduit causes a separation of the particulates from the sand. The particulates and the associated aqueous medium are removed while the cleaned sand settles back into the main filter. Approximately 6.7 gal/min of aqueous medium for the separation of particulates was removed from a 240 gal/min flow entering the filter. (The 240 gal/min flow included the aqueous medium recovered from the scrubbers and a portion of recirculating aqueous medium which by-passed the scrubber). The filtered aqueous medium (the main flow from the filter) was directed at 19 in FIG. 1 to a holding tank having a capacity of at least 500 gallons. A sufficient amount of a 50 percent by weight aqueous sodium hydroxide solution was added at 21 to bring the pH of the aqueous medium in the holding tank back to a value of 12 as measured by pH meter, 23. Additionally, the volume of the aqueous medium lost through the removal of 6.7 gal/min in the filter and through evaporation was compensated by the addition of an equivalent volume of water into the holding tank.

The minor portion from the filter (the portion containing the particulates) was also collected. This collected medium contained 0.153 g/l germanium as dissolved material, 0.007 g/l germanium as particulate material (material retained on a filter with nominal pore size of 0.3 μm), 0.145 g/l of silicon as dissolved material, and 0.027 g/l of silicon as particulate material. (The silicon and germanium concentration was determined by atomic absorption spectroscopy.) The dissolved germanium in the medium collected at 30 was precipitated through addition of an aqueous magnesium sulfate solution to the minor portion in precipitator, 34.

EXAMPLE 2

To determine the effect of various conditions on the precipitation described in Example 1, a series of controlled determinations were performed. In these determinations, a stock aqueous solution containing dissolved germanium was prepared. This stock solution was prepared by first bubbling oxygen at a rate of approximately 0.58 l/min through liquid germanium tetrachloride that was heated to a temperature of 35 degrees C. This procedure produced a gaseous effluent flow with an approximately 1.0 g/min content of germanium tetrachloride. This effluent was combined with a chlorine gas flow of approximately 0.55 l/min and with an additional oxygen gas flow of approximately 3 l/min. The combined gas mixture was introduced into the gas scrubber described in Example 1.

An aqueous medium was prepared by adding 50 ml of 30 percent hydrogen peroxide to 15 liters of deionized water and adjusting the pH of the aqueous medium to 12.5 by a suitable addition of 10 N sodium hydroxide. This aqueous medium was introduced into the scrubber as described in Example 1. The aqueous medium exiting from the scrubber was not introduced into a filter but was directly recirculated through the scrubber after adjustment of its pH and its hydrogen peroxide content. These adjustments were accomplished through the addition of sufficient 10 N sodium hydroxide to reestablish a pH of 12.5 and also an addition of a volume of 10 percent hydrogen peroxide equal to the volume of sodium hydroxide that was added.

Recirculation was continued for approximately 2 hours. The stock solution thus prepared was collected and analyzed for germanium and chloride content. The germanium content was determined to be 2.21 g/l through atomic absorption spectroscopy. The chloride content was determined to be 0.5 moles/l through a silver nitrate titration. The pH of the final stock solution was measured to be 12.25.

A 1.26 molar aqueous solution of magnesium sulfate was used as a precipitating agent. A number of samples were prepared by adding varying amounts of the aqueous precipitating agent to 50 ml aliquots of the stock solution. The magnesium-to-germanium mole ratios in each of these samples are indicated in Table 1.

The resulting precipitate in each sample was recovered by filtering the sample through a membrane having a nominal pore size of 0.45 μm. For each sample, the magnesium and germanium remaining in the filtrate was measured by atomic absorption spectroscopy. Table 1 has a compilation for each sample of the pH of the final filtrate, the germanium remaining in the filtrate, the magnesium remaining in the filtrate, the ratio of the number of moles of magnesium in the precipitate to the number of moles of germanium in the precipitate, and the percentage of the germanium initially in the solution that was removed through precipitation.

The same precipitation procedure was performed except a 1 M aqueous solution of calcium chloride was employed as a precipitating agent. The results are shown in Table 2.

The same precipitation procedure was performed except a 0.903 molar aqueous solution of zinc sulfate was employed as the precipitating agent. The results are shown in Table 3.

The same procedure was performed except a 0.946 molar aqueous solution of ferric nitrate was employed as the precipitating agent. The results are shown in Table 4.

The same procedure was performed except a 0.53 molar aqueous solution of aluminum sulfate was utilized as the precipitating agent. The results are shown in Table 5.

The same procedure was performed except a 0.959 ferrous chloride aqueous solution was employed as the precipitating agent. The results are shown in Table 6.

EXAMPLE 3

A stock solution as described in Example 2 was diluted to form a solution having a germanium content of approximately 0.764 g/l and the pH of this solution was adjusted to approximately 12.5. Silica ($SiO_2$) was added to the solution, and the mixture was allowed to stand overnight. The silica dissolved, yielding a final dissolved silicon concentration of 0.54 g/l. (The silica used had a BET surface area of 380 $m^2/g$ which is believed to be similar to particulates produced by the MCVD process.)

A precipitating agent of 0.981 molar aqueous magnesium sulfate was prepared. A number of samples was prepared by adding various amounts of precipitating agent to 50 ml aliquots of the solution containing the germanium and silicon. The mole ratio of (1) magnesium to (2) germanium plus silicon is shown in Table 7. The resulting precipitate in each aliquot was removed as described in Example 2 and the magnesium, silicon, and germanium concentrations in the filtrate were determined by atomic absorption spectroscopy. The measured germanium concentration in the filtrate, the measured silicon concentration in the filtrate, the measured magnesium concentration in the filtrate, the calculated ratio between (1) the moles of magnesium in the precipitate, and (2) the moles of germanium plus silicon in the precipitate, the percentage of silicon from the solution which was precipitated by addition of the precipitating agent, and the percentage of germanium from the solution that was precipitated are shown in Table 7.

EXAMPLE 4

A sample determination was performed to demonstrate the effect of pH on the efficiency of chlorine removal from the effluent for a process as described in Example 1. A gas mixture of germanium tetrachloride, chlorine, and oxygen was prepared as described in Example 2, except the temperature of the bubbler was maintained at 23 degrees C. Samples of a basic aqueous medium was prepared by addition of sufficient 10 normal aqueous sodium hydroxide solution to 10 gallon portions of deionized water to yield sample media having the pHs shown in Table 8. The aqueous medium and the gas mixture were introduced into a scrubber as described in Example 1. The liquid from the scrubber was collected without recirculation. Samples of the collected liquid were obtained for analysis. In each sample, sufficient hydrogen peroxide was added to completely convert the hypochlorite present to chloride. The chloride and germanium concentrations in the treated sample were measured by silver nitrate titration and atomic absorption spectroscopy, respectively. The flow rate of $GeCl_4$ and chlorine introduced into the scrubber together with the calculated percentage of chlorine removed from the gas mixture and the calculated percentage of germanium tetrachloride removed from the mixture are compiled in Table 8 for each sample. As can be seen at lower pHs, chlorine is not efficiently removed as compared to its removal at higher pHs. It should be noted that at both pHs relatively efficient removal of germanium is achieved.

EXAMPLE 5

Figure 3:
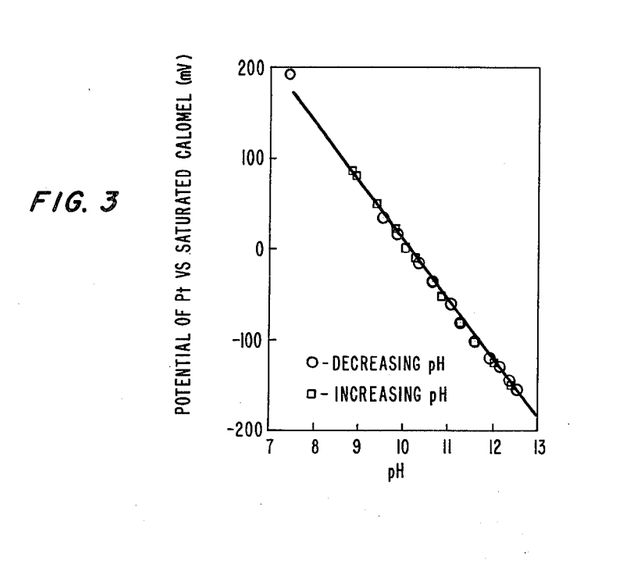

A series of control samples were utilized to demonstrate the appropriate ranges for redox potential control relating to the addition of hydrogen peroxide in a procedure such as described in Example 1. An aqueous stock solution, prepared in the absence of chlorine, was made so that it contained a germanium concentration of 0.75 g/l. Sufficient $Na_2SiO_3 \cdot 5H_2O$ was added to the solution to yield a silicon concentration of 0.51 g/l. The pH of the stock solution was initially 12.56. To a 50 ml aliquot of the stock solution, 3 ml of a 0.88 molar aqueous solution of hydrogen peroxide was added. The pH of the aliquot was decreased in steps by the addition of appropriate quantities of a 1 to 10 by volume solution of concentrated sulfuric acid in water. The pH of the solution was then increased in steps by the addition of suitable quantities of 10 normal sodium hydroxide. At each pH step, the redox potential of the solution was measured by inserting a platinum electrode and a saturated calomel electrode into the solution. The voltage produced across these electrodes was measured utilizing a millivoltmeter. The results are shown in the graph of FIG. 3. The graph indicates a suitable lower limit for the redox potential at a given solution pH. The measured sample solutions had a small amount of hydrogen peroxide present and thus indicates the redox potential of a solution which has unreacted $H_2O_2$ but no remaining hypochlorite.

EXAMPLE 6

Figure 2:
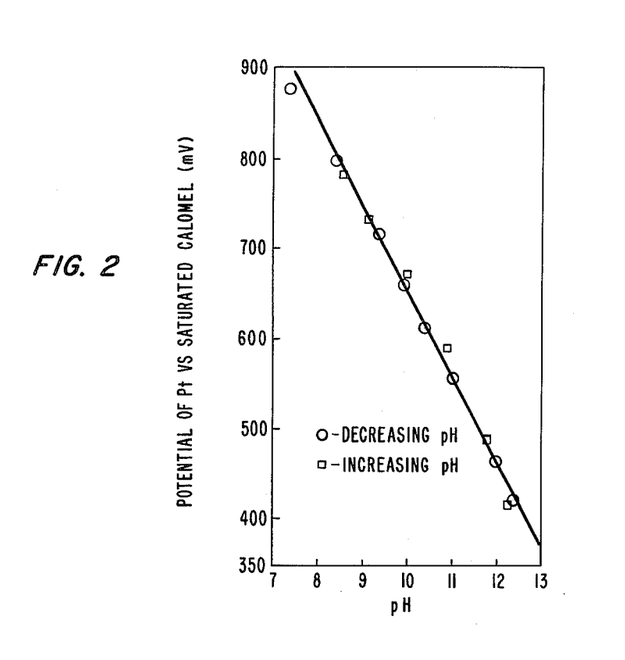
FIGS. 2 and 3 are graphs illustrative of conditions suitable for practice of the inventive process.

The same procedure as described in Example 5 was followed except 3 ml of aqueous 0.0178 M sodium hypochlorite was added instead of 3 ml of hydrogen peroxide solution. The pH was adjusted numerous times as described in Example 5 and the redox potential measured at each step. The measured values are shown in FIG. 2. The graph of FIG. 2 indicates the upper redox potential limit at a given pH since it indicates the redox potential versus pH for a solution containing a small quantity of hypochlorite and no $H_2O_2$.

EXAMPLE 7

The following experiment was performed to demonstrate that hypochlorite concentration is controllable by dynamically monitoring the redox potential of the aqueous medium and making suitable $H_2O_2$ additions in accordance with the monitored potential. A gaseous effluent was produced as described in Example 2 using a bubbler held at a temperature of 35 degrees C. An aqueous medium was prepared by adding sufficient sodium hydroxide to deionized water to yield a pH of approximately 12.2. A scrubber manufactured by the Heat Systems-Ultrasonic, Inc. was employed. The scrubber had a configuration such that the gas effluent was introduced on one side of a packing and the aqueous medium was introduced through a nozzle on the other side of the packing. The packing was made from $\frac{3}{4}$ inch PVC tubing, cut into $1\frac{1}{2}$ inch lengths. This packing was approximately 6 inches deep. The gas was drawn through the packing by a blower that was positioned behind the nozzle. (The blower had a nominal throughput of 85 CFM with a 4 inch intake orifice having an area of 8.8 sq. inches. The intake orifice was reduced to decrease the throughput of the blower by narrowing the orifice area to 1.6 sq. inches). The aqueous medium was forced through a nozzle at a rate of approximately 1.1 gal/min.

The output from the scrubber was drained into a 15 liter tank. The redox potential of the aqueous medium was measured in this tank. A controller was employed which caused the addition of sufficient $H_2O_2$ to the tank so that the redox potential upon fluctuation was returned to 150 mV. The contents of the tank were continuously recirculated to the scrubber.

The effluent flow rate was controlled so that 1 g/min of $GeCl_4$ and 0.023 moles/min of chlorine were introduced into the scrubber. After 40 minutes of recirculation and after 65 minutes of recirculation, a small aliquot of aqueous medium was removed from the tank. The amount of $H_2O_2$ or hypochlorite ions (depending on which one was present) was measured by an iodometric titration. The two measurements yielded approximately equivalent concentration values of 0.0025 moles/l. (This level should be compared to a level of hypochlorite of 0.099 moles/l which would have been obtained after 65 minutes if $H_2O_2$ had not been added.) Due to the additions of $H_2O_2$ to counteract the constant addition of hypochlorite ions, the redox potential did not fluctuate beyond the limits of $-75$ mV and $+250$ mV.

EXAMPLE 8

The effluent from a MCVD reactor was collected and analyzed to show that over a wide range of operating conditions, a substantial fraction of germanium in the effluent is present in gaseous form. The reaction apparatus is described by J. B. MacChesney, "Materials and Processes for Preform Fabrication-Modified Chemical Vapor Deposition," *Proceedings of IEEE*, 68, 1181-1184 (1980). A variety of reaction conditions were employed. Samples were taken at different reaction temperatures, reactant gas compositions, and total gas flows. In each case, a representative sample of the effluent from the reactor was filtered through a Pyrex wool filter to remove particulates and introduced into a 10 cm gas cell in an infrared spectrophotometer. The spectrophotometer was calibrated to relate a given absorbance level to the corresponding concentration of germanium in the sample chamber. This was done by two methods.

In the first method, a known volume of liquid GeCl$_4$ was introduced into the sample chamber, and after this volume evaporated, its absorbence at 462 cm$^{-1}$ was measured. From this measurement and through the use of the Beer-Lambert law, a given absorbence was related to a germanium concentration. Similarly, an effluent sample taken from a GeCl$_4$ bubbler whose flow rate had been calibrated was introduced into the sample chamber and a similar measurement was made. The two measurements correlated within experimental error.

Infrared absorption measurements at 462 cm$^{-1}$ were performed on samples coming from a reactor operated at 1873 degrees K with the initial oxygen, SiCl$_4$, and GeCl$_4$ reaction concentrations as indicated in the columns denominated P° in Table 9. Additionally, the partial pressure of GeCl$_4$ in the effluent in gaseous form and its mole percentage as compared to the initial germanium reactant concentration is also indicated in Table 9.

Table 10 shows a similar series of measurements made with a SiCl$_4$ reactant partial pressure of 0.0427 atms and a GeCl$_4$ reactant partial pressure of 0.00377 atms. The reaction temperature for each run is shown in Table 10 and the corresponding levels of SiCl$_4$ and GeCl$_4$ in the effluents is also shown in that Table. Additionally, the percentage of germanium in the effluent relative to that present in the reaction mixture is shown under the heading "Percent (%)". A set of samples were also measured at varying flow rates and temperatures. The total reactant flow rate and the temperature together with the measured percentage of SiCl$_4$ $_L$ and $_{GeCl4}$ in the effluent is shown in Table 11. As can be seen from Tables 9 through 11, a substantial percentage of gaseous germanium is present over a large regime of reaction conditions.

TABLE 1

Efficiency of Germanium Precipitation by Magnesium
Precipitating Reagent: 1.26 M MgSO$_4$

| moles Mg / moles Ge added | Final pH | Final [Ge] (g/l) | Final [Mg] (g/l) | moles Mg / moles Ge ppt | % Ge Ppt. |
|---|---|---|---|---|---|
| 0.41 | 12.1 | 1.25 | <.0001 | 0.96 | 43 |
| 0.62 | 11.9 | 0.86 | <.0001 | 1.02 | 61 |
| 0.83 | 11.6 | 0.39 | .0003 | 1.01 | 82 |
| 1.24 | — | 0.038 | 0.051 | 1.19 | 98 |
| 1.66 | 10.20 | 0.015 | 0.15 | 1.45 | >99 |
| 2.49 | 9.8 | 0.009 | 0.48 | 1.80 | >99 |
| 4.14 | 9.68 | 0.006 | 1.45 | 1.99 | >99 |
| 8.29 | 9.43 | 0.008 | 4.16 | 1.53 | >99 |

TABLE 2

Efficiency of Germanium Precipitation by Calcium
Precipitating Reagent: 1.00 M CaCl$_2$

| moles Ca / moles Ge added | Final pH | Final [Ge] (g/l) | Final [Ca] (g/l) | moles Ca / moles Ge ppt | % Ge Ppt. |
|---|---|---|---|---|---|
| 0.33 | 12.2 | 1.94 | 0.002 | 2.70 | 11 |
| 0.49 | 12.2 | 1.79 | 0.003 | 2.58 | 18 |
| 0.66 | 12.2 | 1.57 | 0.003 | 2.28 | 28 |
| 1.31 | 12.2 | 1.02 | 0.003 | 2.43 | 52 |
| 1.97 | 12.08 | 0.58 | 0.001 | 2.67 | 72 |
| 3.29 | 11.86 | <0.001 | 0.003 | 3.29 | >99 |
| 6.57 | 11.63 | <0.001 | 3.27 | 3.36 | >99 |

TABLE 3

Efficiency of Germanium Precipitation by Zinc
Precipitating Reagent: 0.903 M ZnSO$_4$

| moles Zn / moles Ge added | Final pH | Final [Ge] (g/l) | Final [Zn] (g/l) | moles Zn / moles Ge ppt | % Ge Ppt. |
|---|---|---|---|---|---|
| 0.30 | 11.8 | 1.71 | 0.004 | 1.38 | 22 |
| 0.44 | 11.6 | 1.50 | 0.001 | 1.42 | 31 |
| 0.59 | 11.1 | 1.18 | 0.0007 | 1.30 | 46 |
| 0.89 | 10.0 | 0.57 | 0.0008 | 1.21 | 73 |
| 1.19 | 9.5 | 0.13 | 0.001 | 1.27 | 94 |
| 1.78 | 8.4 | 0.035 | 0.005 | 1.81 | 98 |
| 2.97 | 6.5 | 0.043 | 1.18 | 2.36 | 98 |
| 5.94 | 6.1 | 0.020 | 5.82 | 2.46 | 99 |

TABLE 4

Efficiency of Germanium Precipitation by Ferric Iron
Precipitating Reagent: 0.946 M Fe(NO$_3$)$_3$

| moles Fe / moles Ge added | Final pH | Final [Ge] (g/l) | Final [Fe] (g/l) | moles Fe / moles Ge ppt | % Ge Ppt. |
|---|---|---|---|---|---|
| 0.31 | 11.7 | 1.52 | <0.0002 | 1.02 | 31 |
| 0.47 | 10.7 | 1.03 | <0.0002 | 0.89 | 53 |
| 0.62 | 10.6 | 0.56 | <0.0002 | 0.84 | 74 |
| 0.93 | 9.6 | 0.085 | <0.0002 | 0.94 | 96 |
| 1.24 | 9.1 | 0.027 | <0.0002 | 1.24 | 99 |
| 1.87 | 7.4 | 0.014 | <0.0002 | 1.87 | >99 |
| 3.11 | 4.3 | 0.027 | <0.0002 | 3.11 | 99 |

TABLE 5

Efficiency of Germanium Precipitation by Aluminum
Precipitating Reagent: 0.53 M Al$_2$(SO$_4$)$_3$

| moles Al / moles Ge added | Final pH | Final [Ge] (g/l) | Final [Al] (g/l) | moles Al / moles Ge ppt | % Ge Ppt. |
|---|---|---|---|---|---|
| 0.35 | 11.5 | 1.82 | 0.19 | 0.69 | 17 |
| 0.52 | 11.0 | 0.99 | 0.044 | 0.86 | 55 |
| 0.70 | 10.4 | 0.27 | 0.024 | 0.77 | 88 |
| 1.39 | 9.2 | 0.058 | 0.004 | 1.43 | 97 |
| 2.09 | 7.3 | 0.055 | <0.001 | 2.15 | 97 |
| 3.49 | 5.1 | 0.27 | <0.001 | 4.02 | 87 |

TABLE 6

Efficiency of Germanium Precipitation by Ferrous Iron
Precipitating Reagent: 0.959 M FeCl$_2$

| moles Fe / moles Ge added | Final pH | Final [Ge] (g/l) | Final [Fe] (g/l) | moles Fe / moles Ge ppt | % Ge Ppt. |
|---|---|---|---|---|---|
| 0.32 | 11.94 | 1.67 | .0006 | 1.34 | 24 |
| 0.47 | 11.82 | 1.39 | .0004 | 1.31 | 36 |
| 0.63 | 11.52 | 1.16 | <.0002 | 1.36 | 46 |
| 0.95 | 10.75 | 0.702 | <.0002 | 1.41 | 67 |
| 1.26 | 9.93 | 0.298 | <.0002 | 1.47 | 86 |

TABLE 6-continued

Efficiency of Germanium Precipitation by Ferrous Iron
Precipitating Reagent: 0.959 M $FeCl_2$

| $\frac{\text{moles Fe}}{\text{moles Ge}}$ added | Final pH | Final [Ge] (g/l) | Final [Fe] (g/l) | $\frac{\text{moles Fe}}{\text{moles Ge}}$ ppt. | % Ge Ppt. |
|---|---|---|---|---|---|
| 1.89 | 9.23 | 0.015 | <.0002 | 1.91 | >99 |
| 3.16 | 7.02 | <.003 | .0043 | 3.16 | >99 |
| 6.31 | 6.31 | <.003 | 2.98 | 4.72 | >99 |

TABLE 7

Efficiency of Germanium and Silicon Precipitation by Magnesium

| $\frac{\text{moles Mg}}{\text{moles Ge + Si}}$ added | Final [Ge] (g/l) | Final [Si] (g/l) | Final [Mg] (g/l) | $\frac{\text{moles Mg}}{\text{moles Ge + Si}}$ ppt Ppt. | % Si Ppt. | % Ge Ppt. |
|---|---|---|---|---|---|---|
| .33 | .347 | .278 | .0026 | .66 | 48 | 54 |
| .66 | .100 | .0732 | .0049 | .76 | 86 | 87 |
| .99 | .0123 | .0195 | .0049 | 1.02 | 96 | 98 |
| 1.33 | .0060 | .0164 | .0070 | 1.35 | 97 | 99 |
| 1.66 | <.002 | .0246 | .0041 | 1.70 | 95 | >99 |

TABLE 8

| pH | Delivery Rates $GeCl_4$ (g/min) | Delivery Rates $Cl_2$ (moles/min) | % $GeCl_4$ removed | % $Cl_2$ removed |
|---|---|---|---|---|
| 10 | 0.524 | 0.0291 | 97 | 3.4 |
| 12.5 | 0.524 | 0.0291 | 93 | 93 |

TABLE 9

| $P_{O_2}$ | $P_{SiCl_4}$ | $P_{GeCl_4}$ | $P'_{GeCl_4}$ | Percent (%) |
|---|---|---|---|---|
| 0.997 | 0.0 | 0.00357 | — | — |
| 0.955 | 0.042 | 0.00343 | 0.00143 | 42% |
| 0.928 | 0.069 | 0.00333 | 0.00177 | 53% |
| 0.867 | 0.130 | 0.00311 | 0.00203 | 65% |
| 0.763 | 0.235 | 0.00271 | 0.00233 | 86% |

TABLE 10

| Temp (K.) | $P_{SiCl_4}$ (atm) | $P_{GeCl_4}$ (atm) | Percent (%) |
|---|---|---|---|
| 1303 | 0.0345 | 0.00256 | 68 |
| 1383 | 0.0387 | 0.00351 | 93 |
| 1433 | 0.0298 | 0.00293 | 78 |
| 1433 | 0.0225 | 0.00377 | 100 |
| 1523 | 0.0155 | 0.00246 | 65 |
| 1638 | 0.0130 | 0.00230 | 61 |
| 1733 | 0.000654 | 0.00151 | 40 |
| 1823 | 0.0 | 0.000789 | 21 |
| 1833 | — | 0.000801 | 21 |
| 1933 | — | 0.00117 | 31 |
| 1933 | 0.0 | 0.00140 | 37 |
| 1973 | 0.0 | 0.00117 | 31 |
| 2023 | 0.0 | 0.00188 | 50 |
| 2103 | 0.0 | 0.00238 | 63 |

TABLE 11

| % unreacted in Effluent $SiCl_4$ | % unreacted in Effluent $GeCl_4$ | T° C. | Total Flow cc/Min |
|---|---|---|---|
| 0 | 87 | 1530 | 5978 |
| 14 | 80 | 1430 | 5978 |
| 11 | 93 | 1430 | 5978 |
| 0 | 70 | 1630 | 5978 |
| 0 | 75 | 1600 | 2988 |
| 0 | 71 | 1630 | 4488 |

I claim:

1. A process for the removal of germanium from the gaseous effluent of an optical fiber fabrication process, wherein said fabrication process involves the reaction of silicon and germanium compounds with oxygen in the substantial absence of a source of hydrogen, comprising the steps of (1) subjecting said effluent to an aqueous medium thereby dissolving gaseous germanium entities from said effluent in said aqueous medium and (2) precipitating said dissolved germanium entities by addition to said aqueous medium of a precipitating agent for said germanium.

2. The process of claim 1 wherein said precipitating agent comprises $Mg^{+2}$.

3. The process of claim 1 wherein said precipitating agent comprises $Ca^{+2}$.

4. The process of claim 1 wherein said aqueous medium comprises an aqueous basic medium.

5. The process of claim 1 wherein $H_2O_2$ is added to said medium to react with $ClO^-$ ions.

6. The process of claim 1 wherein the pH of said aqueous medium is in the range 11 to 13.

7. The process of claim 1 wherein said precipitating agent comprises compounds having a cation chosen from the group consisting of $Fe^{+2}$, $Fe^{+3}$, $Al^{+3}$, and $Zn^{+2}$.

* * * * *

UNITED STATES PATENT AND TRADEMARK OFFICE
CERTIFICATE OF CORRECTION

PATENT NO. : 4,385,915

DATED : May 31, 1983

INVENTOR(S) : Jeffrey A. Amelse, Michael P. Bohrer, and Darwin L. Wood

It is certified that error appears in the above—identified patent and that said Letters Patent is hereby corrected as shown below:

Column 2, line 40, "effcient" should read --efficient--. Column 4, line 12, "to" should read --To--. Column 6, line 8, "reslt" should read --result--. Column 11, line 31, "L and GeCl4" should read --and $GeCl_4$--.

Signed and Sealed this

Eighth Day of November 1983

[SEAL]

Attest:

Attesting Officer

GERALD J. MOSSINGHOFF

Commissioner of Patents and Trademarks